United States Patent
Holly

[11] 3,930,733
[45] Jan. 6, 1976

[54] PROCESS AND APPARATUS FOR MONITORING ANGULAR ORIENTATION

[75] Inventor: Sandor Holly, Falls Church, Va.

[73] Assignee: Atlantic Research Corporation, Alexandria, Va.

[22] Filed: Apr. 15, 1974

[21] Appl. No.: 461,319

[52] U.S. Cl............................. 356/110; 356/152
[51] Int. Cl.²......................................... G01B 9/02
[58] Field of Search.......... 356/28, 110, 111, 106 R, 356/169, 27, 152

[56] References Cited
UNITED STATES PATENTS
3,572,937  3/1971  Baldwin............................ 356/110

OTHER PUBLICATIONS
Farmer; "Observation of Large Particle with a Laser Interferometer" 13 Applied Optics 610, Mar. 1974.

Primary Examiner—John K. Corbin
Assistant Examiner—Conrad J. Clark
Attorney, Agent, or Firm—Martha L. Ross

[57] ABSTRACT

Process and apparatus for sensing the angular orientation of a line or slit element, which comprise producing a laterally moving interference fringe zone wherein the fringe period is substantially wider than the element or the positive difference between the width of the element and a integer multiple of the fringe period, by converging two beams of coherent light of equal intensity and different frequency; positioning the portion of the article bearing the element within the fringe zone such that the article lies in a plane defined by the x and y axes in the fringe pattern and the element is in a position, relative to the article, such that its longitudinal axis is substantially parallel to the fringe plane or can, by rotation of the fringe zone relative to the article around the z-axis, be brought into fringe-plane parallel position; rotating the fringe zone and/or the article around the z-axis to produce relative angular rotation between them; and determining the ratio of AC to DC signal components of the radiation scattered by the line or transmitted by the slit as rotation around the z-axis continues. The maximum AC/DC ratio indicates parallel fringe-plane alignment of the element and the degree of angular rotation from a given relative position of the fringe plane and the element to a succeeding position of parallel fringe-plane and element alignment indicates the angular orientation of the element on the article.

49 Claims, 10 Drawing Figures

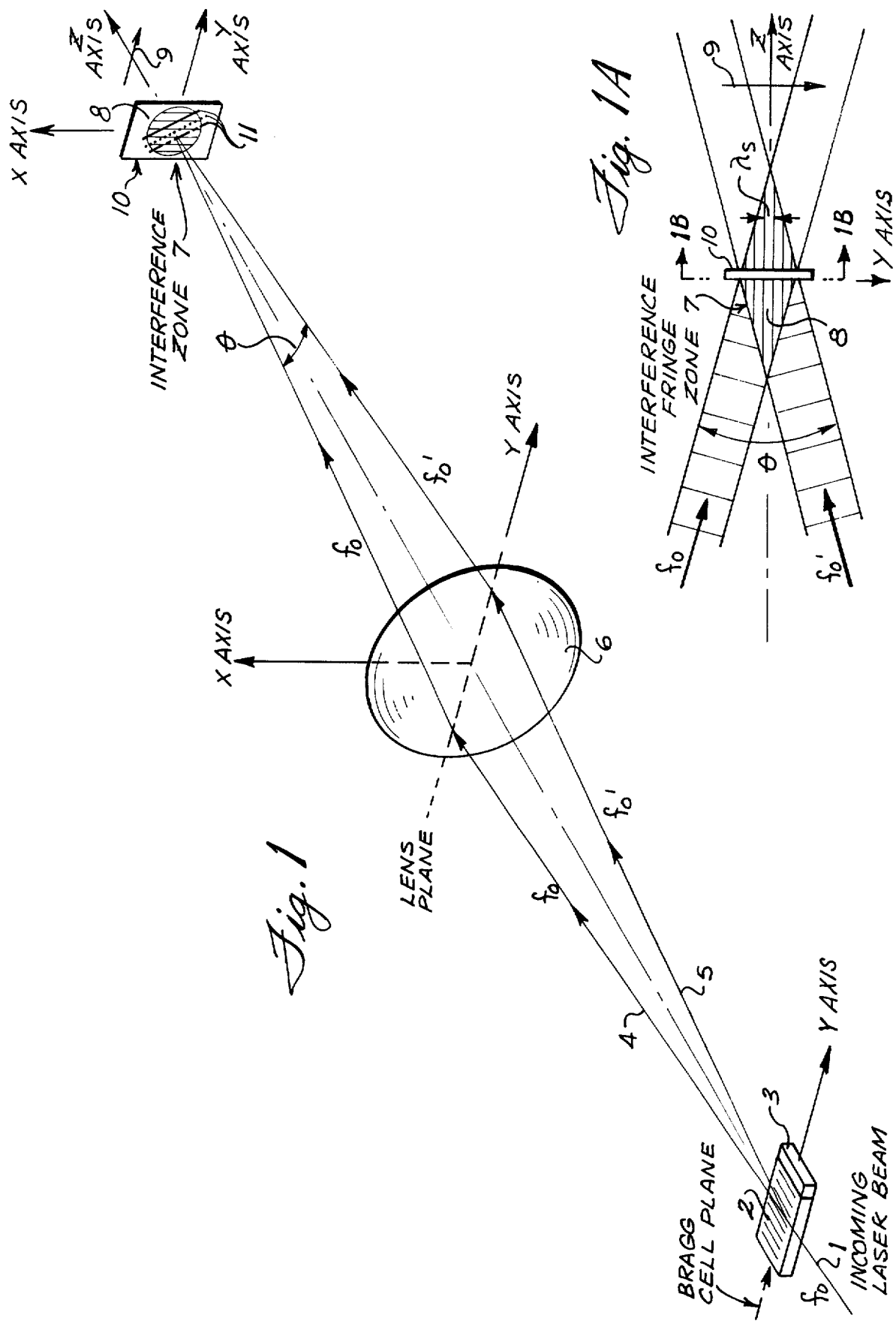

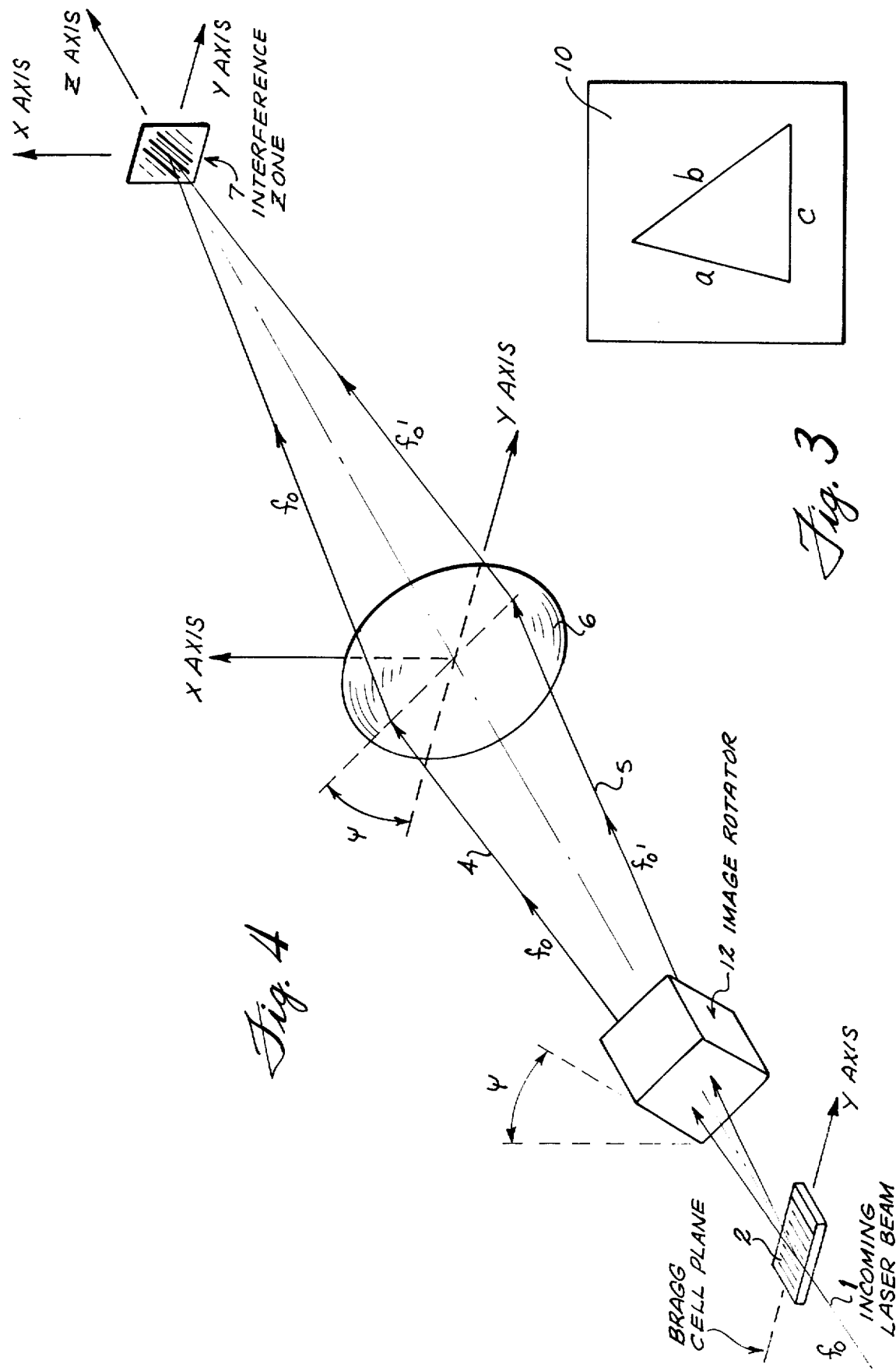

PROCESS AND APPARATUS FOR MONITORING ANGULAR ORIENTATION

BACKGROUND

There has long been a need for rapidly and accurately sensing the angular orientation of lines or slits on manufactured articles, such as microcircuits, optical masks, semiconductors, grills, gratings, meshes, patterns, and the like, without actual physical contact, for such purposes as quality control, control of the manufacturing process, and assembly line orientation of the article. It will be understood that the terms "line" and "slit," as used in this specification and claims, include both continuous and discontinuous straight lines or slits. In the latter case, it is essential only that the centers of discontinuous components making up the "line" or "slit" be arranged along the same longitudinal axis and the fringe period be substantially wider than the widest component, or the positive difference between the width of the component and a whole integer multiple of the fring period. Within these limitations, the components can be of any desired shape and size, e.g., rectangular, triangular, trapezoidal, round, oval, and the like. The line can also be a line defining an edge of the article.

Monitoring of angular orientation on manufactured articles is generally accomplished by such manual and visual means as superimposing an image on a standard or master. Such methods are laborious, tiring, and are subject to human error. Another method, which is more accurate but is very expensive and complex, involves the use of an image which is converted to electronic signals and compared by a computer with a master image. The rotation of the monitored image must be accomplished in very small increments, each of which must be compared by the computer. In some cases, no reliable or feasible automatic method has hitherto been available.

Laser Doppler Velocimeters (LDV) have recently been developed for determining the rate of fluid flow in wind and water tunnels by suspending small particles in the fluid and determining their velocity and size by means of the velocimeter. Such velocimeters generally comprise convergent laser beams of equal size, intensity, and frequency which produce a stationary interference fringe pattern within the zone of convergence, sometimes called the probe volume. The interference fringes are planes which are normal to the plane defined by the center lines of the two converging laser beams and parallel to the bisector of the converging beams. In operation, the apparatus is set up so that the fluid-borne particles move across the fringes in a plane normal to the fringe planes, the radiation scattered by the moving particles is optically collected, separated electronically into AC and DC signal components, and the AC/DC ratio is used as a means of determining the size of the particles. Such Laser Doppler Velocimeters are described in detail in the article by W. M. Farmer, "Measurement of Particle Size, Number Density, and Velocity Using a Laser Interferometer," Applied Optics, Vol. 11, No. 11, Nov. 1972, pp. 2603–2612, and G. J. Rudd, U.S. Pat. No. 3,680,961.

In more recent development of the Laser Doppler Velocimeter, the art discloses the use of probe volumes in which the fringes are caused to move continuously in a direction normal to the fringe planes by employing converging laser beams of the same intensity but slightly different frequency, the frequency difference $\Delta f$ being within the radio frequency band. Such shifting of the frequency of one of the beams can, for example, be produced by diffraction of an incident laser beam by means of an ultrasonic Bragg cell, which can be made to divide the incident beam into two diverging beam components of the same intensity, one nondiffracted component having the incident beam frequency and the other diffracted component with its frequency shifted by an amount equal to the Bragg cell frequency. Since the two coherent light beams which leave the Bragg cell are diverging, it is required that the beams be converged by an appropriate optical system to form the desired interference fringe pattern. The moving fringe pattern moves at a rate equal to $\Delta f$ which in turn is equal to the Bragg cell frequency.

The moving fringe technique has been applied to the LDV primarily to provide a means for determining the direction of movement of the particles moving across the fringe planes. It provides no improvement in determination of particle size. The application of single and two-dimensional Bragg cell systems to the LDV is disclosed in Chu et al, "Bragg Diffraction of Light by Two Orthogonal Ultrasonic Waves in Water," Appl. Phys. Lett., Vol. 22, No. 11, 1 June 1973, pp. 557–59; and W. M. Farmer et al, "Two-Component, Self-Aligning Laser Vector Velocimeter," Applied Optics, Vol. 12, No. 11, Nov. 1973, pp. 2636–2640.

None of the available art recognizes or discloses the present invention, its principle of operation, or its use for sensing the angular orientation of line or slit elements of an article. The present invention utilizes known fringe spacings (which can be calculated or otherwise determined by conventional art techniques) and rotation of the fringe zone and article relative to each other to determine the angle of orientation of line or slit elements on the article. Any observed deviation of angular orientation can, by means of appropriate conventional electronics, be employed, either in a simple display showing the deviation or as a feedback means for regulating the article production process.

Because the measurement does not require absolute measurement of laser light intensity, but only the detection of angular position(s) where maximum occurs, the process and apparatus of the invention have additional advantages including but not limited to the following. Accuracy of measurement is largely independent of intensity fluctuations of the laser source. Accuracy is not affected or compromised by the reflectivity or refractivity of the line elements. Accuracy does not depend on the calibration accuracy of the signal detector devices or the distortions or nonlinearities of components of the optical system, either per se or in terms of sensitivity to changing environmental conditions. Thus, the system and components can be relatively low-cost and can be used in uncontrolled environments, such as manufacturing facilities.

SUMMARY OF THE INVENTION

The invention comprises a process (and apparatus therefor) for sensing the angular orientation of at least one line or slit element of an article by providing a laser source; dividing the coherent laser beam into two coherent beams of equal size and intensity which differ in frequency, the difference being within the radio frequency band; converging the two beams to form, within the volume of convergence, an interference fring pattern zone; positioning at least the portion of the article bearing the element within the fringe zone in such manner that the article lies in a plane defined by the axis normal to the plane of the convergent beams (x-axis) and the axis normal to the fringe planes (y-axis) and the element is in a position, relative to the article, such that its longitudinal axis is substantially parallel to the fringe plane or can, by relative rotation of the fringe zone and article, each to the other, around the axis defined by the converging beam bisector (z-axis), be brought parallel to the fringe plane; rotating the fringe zone and/or the article around the z-axis to produce relative angular rotation between them; and determining, by suitable conventional equipment, the ratio of AC to DC signal components of the radiation scattered by the line element or transmitted by the slit element as rotation around the z-axis continues.

The width of the fringe spacing (fringe period) should be substantially wider than the element or, in the case of an element which is wider than at least one fringe period, the difference between the width of the element and a whole integer multiple of the fringe period. The fringe period is a known quantity since it can be determined by conventional techniques from such factors as laser wavelength and angle of convergence of the beams. Adjustment of the system to provide a given fringe period can be accomplished in various ways as, for example, by changing the input laser wavelength. Generally, it is most easily achieved by adjusting the convergent angle of the beams by such conventional means as shifting the converging optics along the z-axis. Where the width of the element is known, the fringe period can be set at the beginning of the scanning operation, as aforedescribed. Where such information is not available, it can be adjusted after an initial scanning, in accordance with the invention, to provide a fringe period of the desired width relative to the width of the element.

A substantial difference in width between the fringe period and the element, as aforedescribed, is essential since sensing of the angular orientation of the element is determined by the degree of angular roation of fringe zone to article required to bring the element from its initial position to a position parallel to the fringe plane and, thereby, to a position giving a maximum AC/DC ratio. An element width equal to the fringe period (or a whole integer multiple of the fringe period) would produce an AC/DC ratio equal to zero or a minimum approaching zero for any angular orientation of the element with respect to the fringe plane, so that its orientation cannot be sensed by the method of the invention.

Optimum conditions for angular orientation resolution, though not essential for operation of the invention, can be obtained in the following ways:

1. Reducing ratio of element width (w) and fringe period width ($l$ or $\lambda_s$). This can be accomplished, for example, by adjustment of the fringe period. Preferably the $\lambda_s$ is adjusted to be wider than the element with the ratio of $w$ to $\lambda_s$ being one-half or less. In the case where the element is wider than an integer multiple of $\lambda_s$, the aforedescribed width difference is preferably about one-half $\lambda_s$.

2. Decreasing the ratio of the fringe period width to the illuminated length (IL) of the element. Maximum resolution in this case is obtained with an element whose illuminated length is coextensive with the fringe plane with which it is parallely aligned in the fringe zone. Such a ratio results in the smallest angle of relative rotation ($\Psi$) required to produce an AC/DC ratio varying from maximum to zero or a minimum approaching zero and, thereby, maximum angular resolution. Optimization of illuminated length can be obtained, for example, by adjustment of the size (diameter) of the fringe zone. Size of the fringe zone is primarily a function of the width of the two convergent beams, which in turn is a function of the width of the laser beam. Thus, zone size for a given laser can be changed, for example, by such means as positioning a divergent or convergent optical means, e.g., a lens, in the path of the laser beam prior to splitting it into the two coherent light beams or in the path of each of the equally split beams. The former is generally less cumbersome than the latter and is, therefore, preferred.

From the foregoing, it will be seen, therefore, that signal resolution and, thereby, angular resolution improves in accordance with the following relationship: $w < l << \text{IL}$.

In the case where the element is wider than $l$ ($\lambda_s$), the relationship is $0 < (w - n\ l) < l << \text{IL}$ wherein $n$ is an integer.

The requisite relative rotation of the fringe zone and the article can be obtained by rotating either one. Rotation of the fringe zone can be accomplished, for example, by rotation of the means for dividing the laser beam into the two coherent beams, such as a Bragg cell. Since this may be somewhat cumbersome, it is preferred to employ rotating optical means, such as mirrors or prisms, designed receive and transmit the two coherent light beams without change other than rotation around the z-axis. This is a preferred embodiment in cases where correct positioning of the article with respect to angular orientation of its elements is not essential as a step in a manufacturing process as is, for example, the case for certain types of microcircuits. In such case, the article can be rotated by conventional means while in the fringe zone and rotation stopped by use of conventional electronic feedback means activated by an AC/DC ratio circuit when proper element angular orientation has been sensed as aforedescribed. It is, of course, also possible to rotate both the fringe zone and the article with respect to each other in opposite directions or in the same direction at a different rate of rotation.

As aforementioned, the invention can be employed to determine the angular orientation of one or a plurality of line or slit elements on an article. The elements can be parallel or angularly oriented to each other, as in the case of a pattern.

When the article is initially positioned in the fringe zone in a predetermined manner, (e.g., a rectangular article positioned with one side or "base line" parallel to the y-axis) the degree of angular rotation required to achieve the first AC/DC ratio maximum indicates the angular orientation of one element or plurality of parallel elements relative to the initial base line of the article. When additional angularly oriented elements are present, a second AC/DC ratio maximum is obtained when the differently oriented element (or plurality of parallel elements) is rotated into fringe-plane alignment. The degree of angular rotation from the first maximum required to achieve the second maximum indicates the angular orientation of the second element with respect to the first element. The number of differently oriented lines or slits on the article determines the number of AC/DC ratio maxima in the course of a complete rotation, e.g., through 0° – 180° or 0° – 360°, as required by the angular orientation of all of the elements. In the case of parallel lines, the AC/DC ratio maximum is reached when all of the lines are brought into parallel relationship with the fringe planes. For enhanced resolution of equally spaced parallel elements, it is desirable, though not essential, to adjust the fringe periods so that they coincide with the spacing of the elements. Some articles, e.g., photo masks, grids, microcircuits, or the like, may bear arrays of parallel elements at different angles to each other. In such a case, as the fringe zone and article rotate relative to each other, a first AC/DC ratio maximum is obtained when one array of parallel elements comes into fringe plane alignment, a second AC/DC ratio maximum occurs as rotation continues and a second array of parallel lines comes into fringe plane alignment, etc.

The invention has important use in determining accuracy of a pattern defined by a finite number of straight lines (as distinguished from a circle or oval), such as a triangle, rectangle, parallelogram, hexagon, and the like. In the course of a half rotation (0° – 180°), the angular orientation of each line, side, or slit of the pattern relative to each succeeding line, side, or slit can be accurately sensed, recorded or compared with a standard. Generally, the orientation of the pattern relative to a base line of an article bearing it is not of importance. However, if required, this can also be determined by predetermined initial positioning of the article.

The invention also has important application in sensing the position and shape of line or line-bordered elements in an array of differently shaped items on an article, such as photographic prints and transparencies, biological slides, and the like. In such case, the AC/DC ratio signals are employed in a data acquisition system, which may include, for example, conventional data buffer, computing logic, and display.

In the case of opaque, line-bearing articles, the scattered radiation is reflected and the optical system for gathering the scattered light is set up, in conventional manner, to pick up back-scatter. In the case of line-bearing transparent articles and slits, the radiation is transmitted and should be collected downstream of the fringe zone. It should also be noted that, in the case of transparent articles, lines at different levels within and/or on opposite sides of the article can be sensed for angular orientation.

The AC/DC ratio signals can be relayed by means of conventional electronics to a data acquisition system, such as a recording or display, and compared with a master; to means, such as a stepping or servomotor to rotate the article into desired position; or to the manufacturing process for automatic angular orientation control by such conventional means as employing a ratio meter which can generate an error voltage proportional to the degree of deviation.

DRAWINGS

FIG. 1 is a diagrammatic illustration showing an embodiment of an optical system for implementing the angular-orientation monitoring system of the invention and the coherent light beam paths and relationships.

FIG. 1A is an enlarged diagrammatic illustration showing the cross-over of the converging beams and resulting moving interference fringe zone in FIG. 1.

FIG. 3 is exemplary of a pattern, the angular accuracy of which can be sensed by the process and apparatus of the invention.

FIG. 4 is similar to FIG. 1 but shows the use of a means to rotate the fringe zone.

DETAILED DESCRIPTION

Figure 1B:
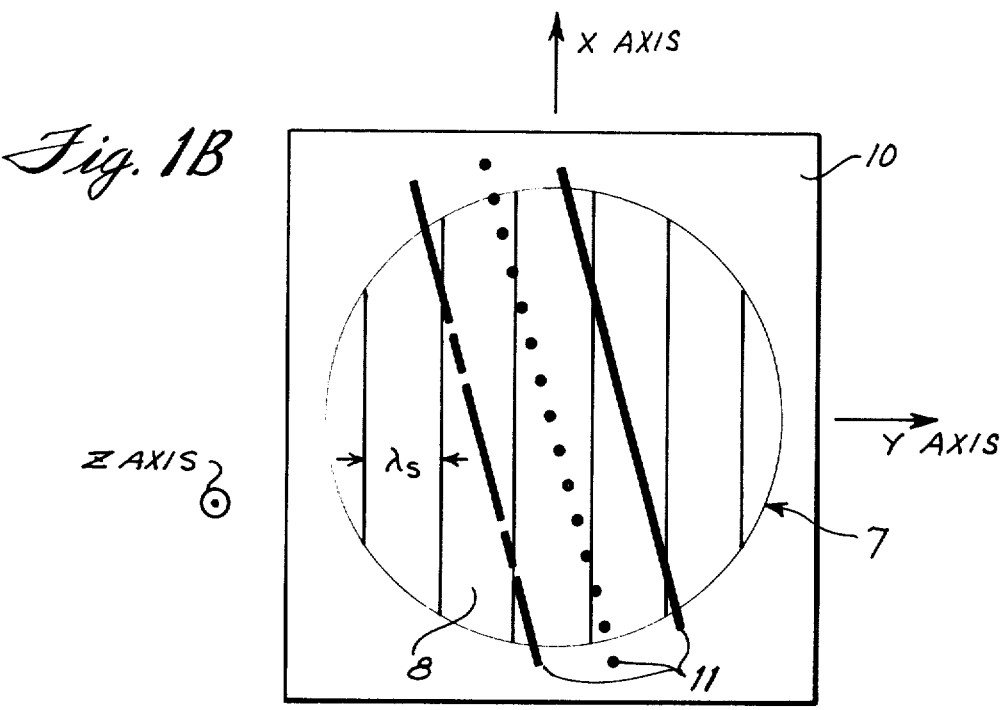
FIG. 1B shows a cross-section of FIG. 1A.

In FIG. 1, laser beam 1 of frequency $f_o$ enters at a slight angle, diffraction Bragg cell 2 which is filled with a liquid such as water and compressionally driven by crystal transducer 3 at an imposed oscillation frequency, e.g., 10 or 15 Mc, to form acoustic wavelengths $\lambda_s$ in the cell medium. The input laser beam is divided by the Bragg cell into two coherent light beams of equal intensity, one beam 4 being nondiffracted and having the original $f_o$ frequency, and the other beam 5 being diffracted and acoustically modified into slightly shifted frequency $f_o'$. The difference in frequency $\Delta f$ is within the radio frequency range. The diverging beams leaving the cell are passed through appropriately designed convex lens 6, which converges the beams at cross-over zone 7 at an angle of convergence $\theta$. Within the zone of convergence a pattern of alternating dark and light interference fringes 8, shown out of proportion in FIG. 1, is more clearly defined in FIG. 1A. The fringes move in the direction shown by arrow 9 at a rate equal to $\Delta f$. FIGS. 1 and 1A show the relative positions of the $x$, $y$, and $z$ axes. It will be seen in FIG. 1A that the $y$ and $z$ axes lie in the plane of the paper and the $x$ axis is perpendicular to the paper. The bisector of the two diverging-converging $f_o$ and $f_o$ beams produced by the Bragg cell lie along the $z$ axis; the normal to the fringe planes ($y$ axis) is perpendicular to the converging beam bisector ($z$ axis), the fringe planes are in the $x$–$z$ plane; and the fringes move in the $y$ direction. Article 10 bearing line or slit elements 11 is positioned in the $x$–$y$ plane and held, by means not shown, within the fringe zone, preferably at or near its geometric center as shown.

The fringe spacing or period $\lambda_s$ is determined by the equation:

$$\lambda_s = \frac{\lambda}{2 \sin(\theta/2)}$$

where $\lambda$ is the wavelength of the incident laser beam. It is obvious, therefore, that the size of the fringe period $\lambda_s$ can be varied by varying either or both $\lambda$ and $\theta$. In general, it is easier to vary $\lambda_s$ by adjusting the convergent beam angle $\theta$, as, for example, by shifting the position of the converging lens in the system shown in FIGS. 5 and 6.

FIG. 1B shows, in cross-sectional expanded view, the relationship of line or slit elements 11 on article 10 to the fringe planes, as initially positioned. In this case, the x and y axes lie in the plane of the paper and the z axis is perpendicular to the plane. All of the elements, as schematically shown, are narrower than the fringe period.

Figure 1C:
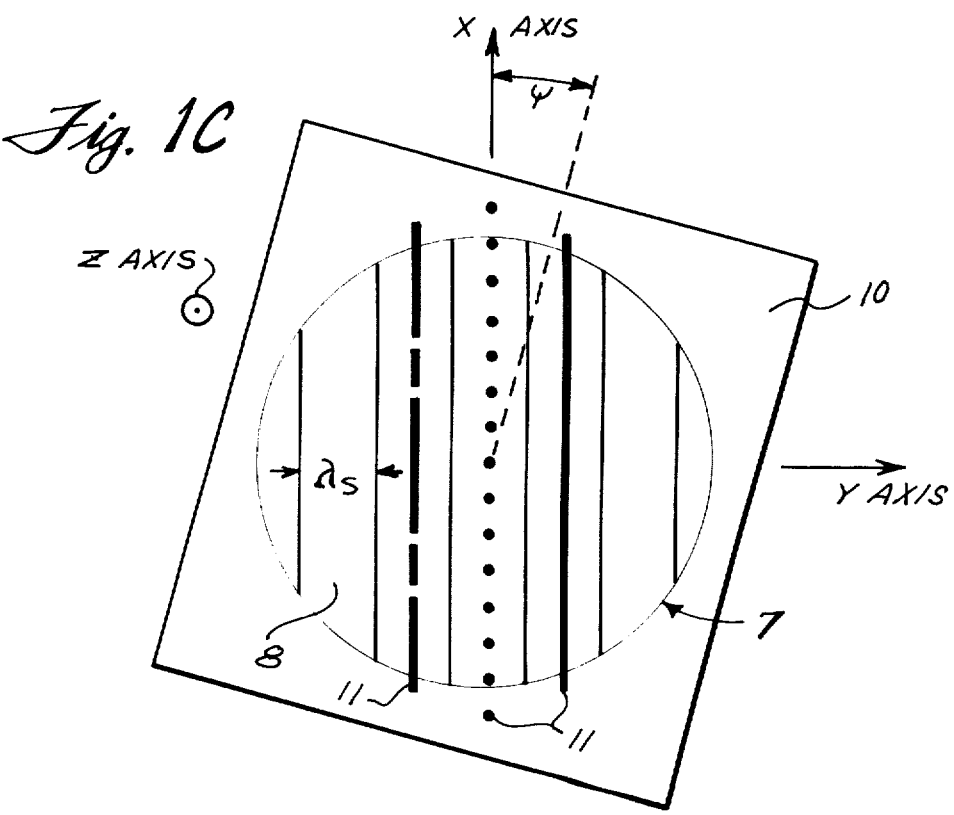
FIG. 1C is similar to 1B but shows rotation of the article relative to the fringe zone.

It will be noted that, as shown in FIG. 1B, the parallel elements 11 are angularly positioned nonparallel to the fringe plane so that they effectively reduce the AC signal component of the scattered radiation and, thereby, the AC/DC signal ratio. In FIG. 1C, article 10 has been rotated around the z-axis through angle Ψ to bring the elements into a position parallel to the fringe plane. In this position, the AC signal component and the AC/DC ratio are at a maximum. A similar situation prevails when the fringe zone instead of the article is rotated around the z-axis.

Figure 2:
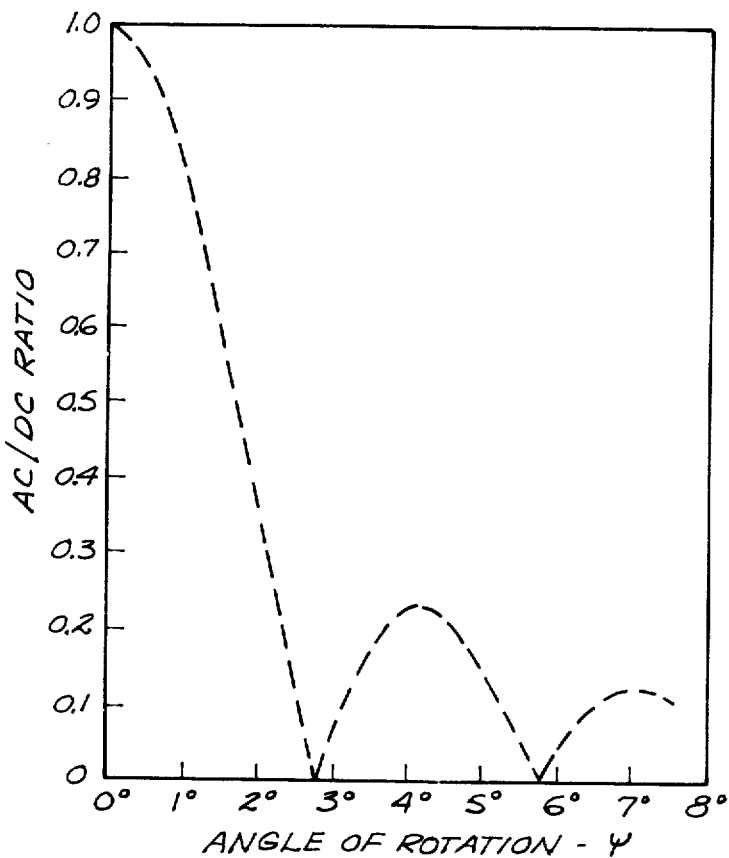
FIG. 2 is a graph showing the relationship of the AC/DC ratio to the angle of rotation for a given fringe and element.

FIG. 2 is a graph which plots the AC/DC ratio versus the relative angle of rotation around the z-axis in the case of an article bearing a single line or slit element. The fringe zone has a diameter of 1 mm and a fringe period equal to 50 $\mu$. The width of the single element is less than one-half the width of the fringe period and has a length at least equal to the illuminated length. The graph starts at an initial position of parallel element-fringe-plane alignment. It will be noted that in this position the AC/DC ratio is normalized to unity and is at its maximum. As the element or fringe zone is rotated through angle of rotations Ψ, the angular orientation of the element relative to the fringe plane changes with corresponding decrease in AC/DC ratio until a first minimum at Ψ = 2.86° is observed when the element is at an angle such that its length traverses the width of one fringe spacing. As rotation continues and the length of the element rotates across adjacent fringe spacings, the AC/DC ratio increases again to peak at a much lower level than the parallel alignment maximum, with successive peaks becoming progressively shallower. In the case where the article bears additional nonparallel elements, as in the case of a pattern such as shown in FIG. 3, successive AC/DC ratio maxima occur as sides a, b, and c of the triangle rotate into parallel fringe plane alignment and can be readily distinguished from the shallow intermediate peaks shown in FIG. 2.

FIG. 4 is similar to FIG. 1 but shows the rotation of the fringe zone by means of image rotator 12. Angle Ψ illustrates the degree of rotation of the rotator, the two beams 4 and 5, as shown at the converging lens 6, and the fringe zone 7. The rotator means can be any conventional mirror or prism means, which can receive two beams of light, rotate their plane and transmit them otherwise unchanged. Examples include, but are not limited to, mirrors or prisms such as the Dove, Abbe, Taylor, Schmidt, and Uppendahl optical devices, sometimes referred to as image rotators. The image rotator is preferably positioned upstream of the converging lens 6 as shown, although it can optionally be positioned downstream.

Figure 7:
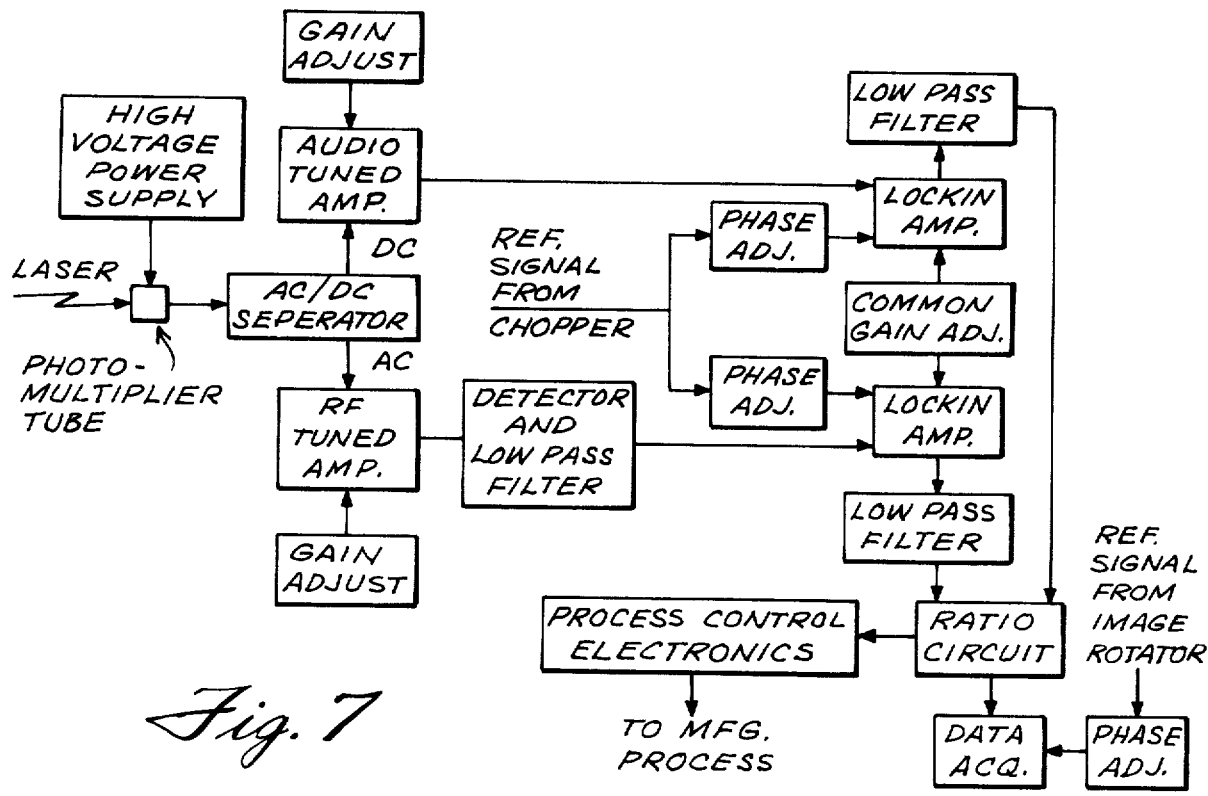
FIG. 7 is a schematic illustration of components which can be used for the "electronics" system of FIGS. 5 or 6.
Figure 5:
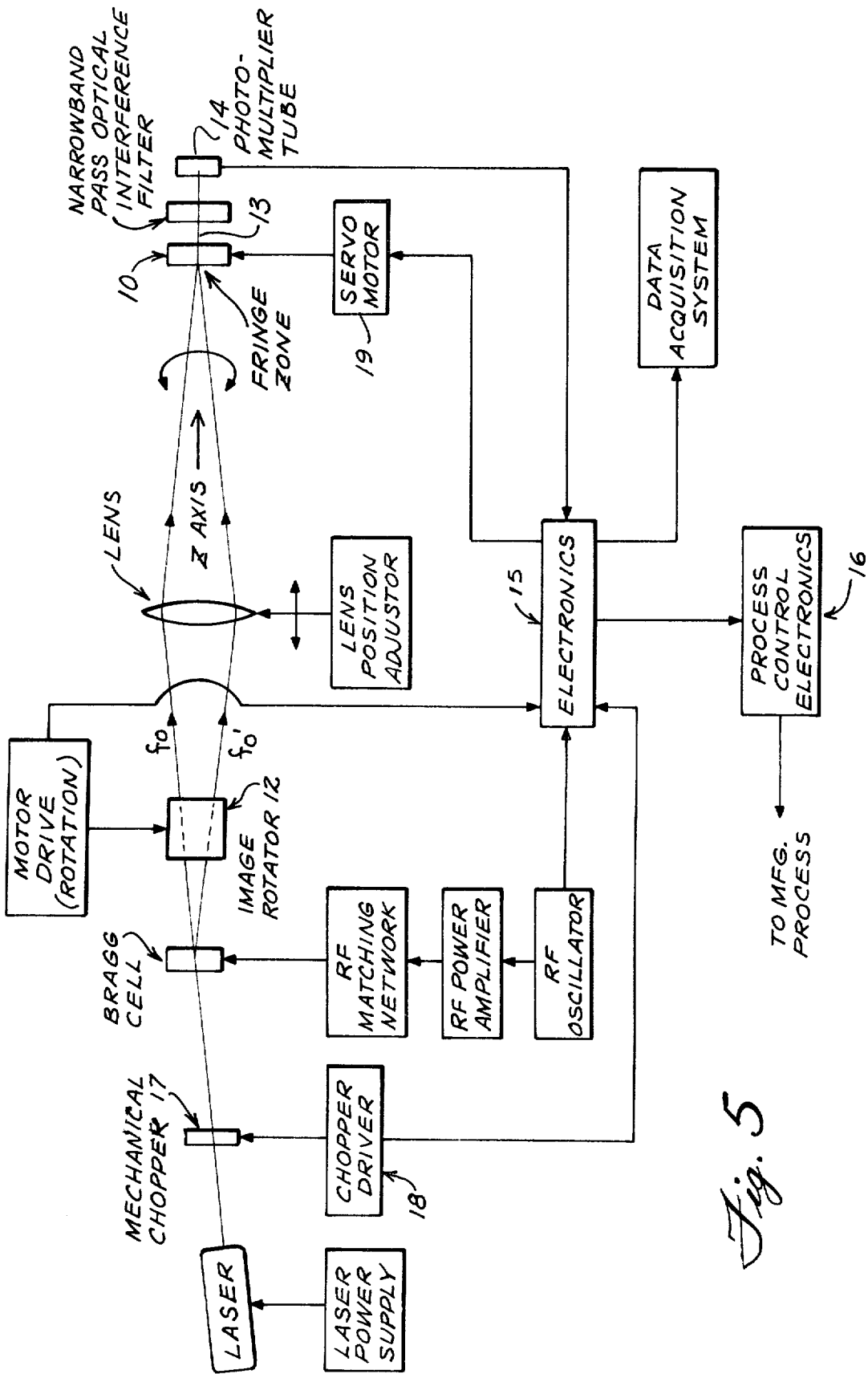
FIG. 5 is a schematic illustration of an embodiment with associated systems components employing "on-axis" transmitted radiation detection for use with slit elements or transparent linebearing articles.

FIG. 5 illustrates an embodiment such as previously described with associated devices for obtaining and utilizing the desired signals. All of the associated optical and electronic components shown in this and succeeding Figures are within the state of the art and, therefore, do not require detailed description. This embodiment is designed to collect "on-axis" transmitted radiation produced by slit elements or transparent line-bearing articles. The radiation 13 transmitted by article 10 is passed into photomultiplier 14. From there the signal passes into an electronics system 15, an illustrative type of which is shown in FIG. 7. The electronics system separates the signal into its AC and DC components, amplifies, rectifies, and filters them, and then passes them into a ratio circuit which then passes the output to a data acquisition system, which can be employed to produce visual displays or recordings, or relays it into a closed loop process control electronics system 16 which feeds back to a manufacturing process to eliminate angular deviations, if necessary. Chopper 17 may optionally be inserted between the laser and Bragg cell and a reference signal at the chopping frequency, from chopper driver 18, can be fed into the electronics to allow synchronous detection of the signals. In addition, a reference signal with frequency equal to the RF frequency of the Bragg cell may be used to demodulate the RF component of the total signal. Alternatively, a narrow band amplifier tuned to the RF frequency may be used followed by a conventional demodulator (as shown in FIG. 7). FIG. 5 shows both image rotator 12 for rotation of the fringe zone and servomotor 19 for rotation of the article for alternative or simultaneous use, as desired.

Figure 6:
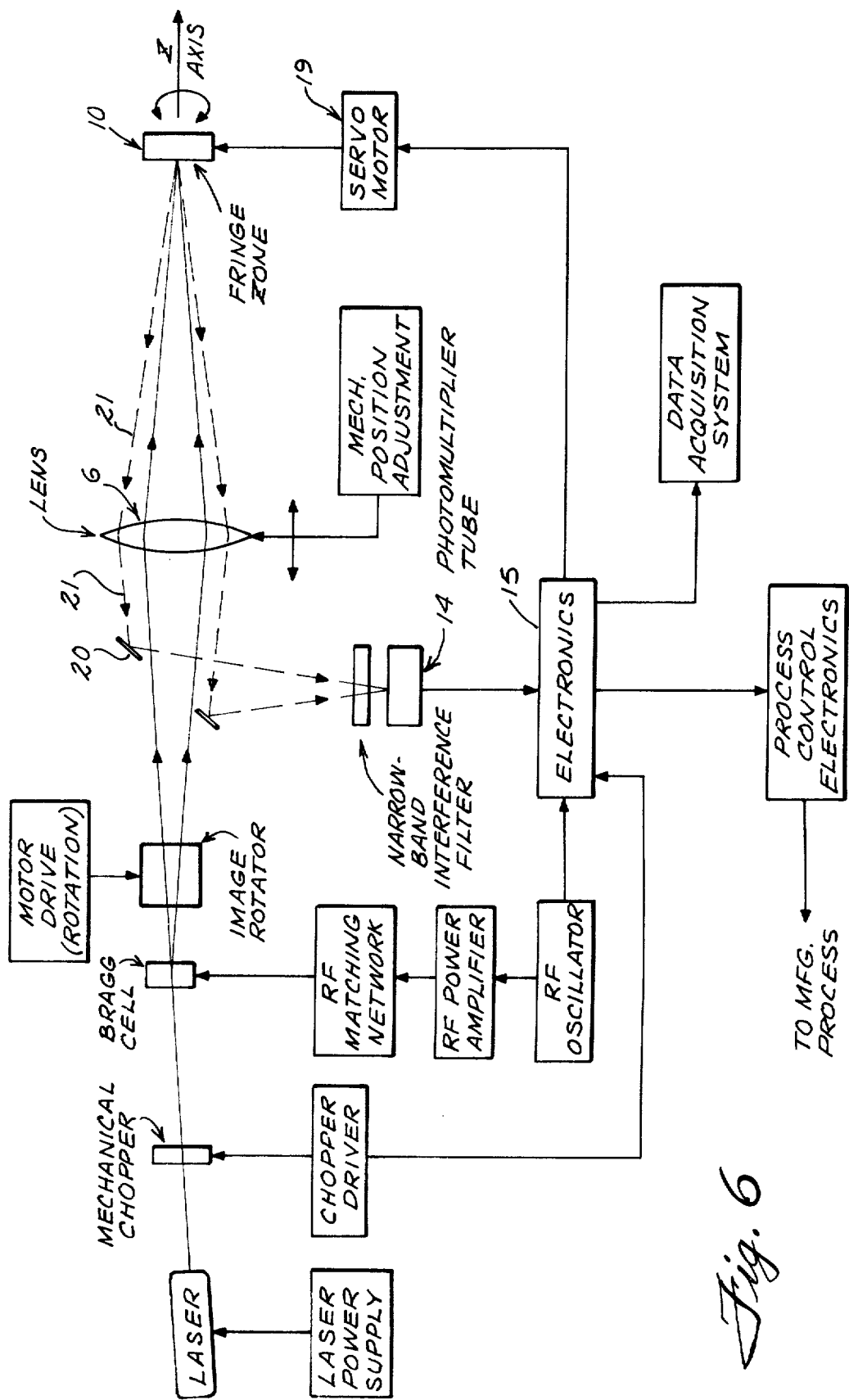
FIG. 6 is a schematic illustration of a modified system employing "on-axis" back-scatter detection for use with opaque line-bearing articles.

FIG. 6 shows a system generally similar to that of FIG. 5 except that it uses lens 6 and annular mirror 20 to collect the radiation 21 back-scattered by the article line elements and to focus it onto photomultiplier 14.

FIG. 7 shows schematically an electronics system 15 in detail which is adequately defined by the legends.

It will be understood that different optical and electronics means known to the art can be employed to practice the invention.

Although this invention has been described with reference to illustrative embodiments thereof, it will be apparent to those skilled in the art that the principles of this invention can be embodied in other forms but within the scope of the claims.

I claim:
1. A process for sensing the angular orientation of at least one line or slit element of an article, comprising:
 1. producing two coherent light beams of the same intensity, one of said beams having a different frequency from said other beam, the frequency difference being within the radio frequency range;
 2. converging said beams to form an interference zone comprising a laterally moving fringe pattern within the zone of convergence, said pattern having a fringe period which is substantially wider than said element or the positive difference between the width of the element and a whole integer multiple of the fringe period;
 3. positioning at least the portion of said article bearing said element within the interference zone in such manner that said article lies in a plane defined by the axis normal to the plane of the convergent beams and the axis normal to the fringe planes, and said element is in a position, relative to said article, such that the longitudinal axis of said element is substantially parallel to the fringe plane or can, by rotation of said fringe zone and/or said article relative to each other around the z-axis by the converging beam bisector, be brought into fringe-plane parallel position;
 4. rotating the fringe zone and/or the article positioned within said fringe zone around the z-axis in such manner as to produce relative angular rotation between them; and

5. continuously determining the ratio of AC to DC signal components of the resulting scattered or transmitted radiation as rotation continues, whereby varying AC/DC ratios are obtained in the course of said rotation, a maximum AC/DC ratio indicates parallel fringe plane alignment of the element, and the degree of angular rotation from a given relative position of the fringe plane and the element to a succeeding position of parallel fringe-plane and element alignment indicates the angular orientation of the element on the article.

2. The process of claim 1 wherein the fringe period is at least twice as wide as the element.

3. The process of claim 1 wherein the illuminated length of the element is substantially larger than the fringe period.

4. The process of claim 2 wherein the illuminated length of the element is substantially larger than the fringe period.

5. The process of claim 1 wherein the said at least one element is a plurality of elements.

6. The process of claim 2 wherein the said at least one element is a plurality of elements.

7. The process of claim 3 wherein the said at least one element is a plurality of elements.

8. The process of claim 4 wherein the said at least one element is a plurality of elements.

9. The process of claim 5 wherein at least two of said elements are at a nonparallel angle each to the other.

10. The process of claim 6 wherein at least two of said elements are at a nonparallel angle each to the other.

11. The process of claim 7 wherein at least two of said elements are at a nonparallel angle each to the other.

12. The process of claim 8 wherein at least two of said elements are at a nonparallel angle each to the other.

13. The process of claim 5 wherein said elements comprise at least one array of parallel elements.

14. The process of claim 6 wherein said elements comprise at least one array of parallel elements.

15. The process of claim 7 wherein said elements comprise at least one array of parallel elements.

16. The process of claim 8 wherein said elements comprise at least one array of parallel elements.

17. The process of claim 1 wherein the AC/DC ratio signals are transmitted to angle-orientation adjustment controls in a manufacturing process.

18. The process of claim 2 wherein the AC/DC ratio signals are transmitted to angle-orientation adjustment controls in a manufacturing process.

19. The process of claim 3 wherein the AC/DC ratio signals are transmitted to angle-orientation adjustment controls in a manufacturing process.

20. The process of claim 4 wherein the AC/DC ratio signals are transmitted to angle-orientation adjustment controls in a manufacturing process.

21. The process of claim 5 wherein the AC/DC ratio signals are transmitted to angle-orientation adjustment controls in a manufacturing process.

22. The process of claim 6 wherein the AC/DC ratio signals are transmitted to angle-orientation adjustment controls in a manufacturing process.

23. The process of claim 7 wherein the AC/DC ratio signals are transmitted to angle-orientation adjustment controls in a manufacturing process.

24. The process of claim 8 wherein the AC/DC ratio signals are transmitted to angle-orientation adjustment controls in a manufacturing process.

25. The process of claim 9 wherein the AC/DC ratio signals are transmitted to angle-orientation adjustment controls in a manufacturing process.

26. The process of claim 10 wherein the AC/DC ratio signals are transmitted to angle-orientation adjustment controls in a manufacturing process.

27. The process of claim 11 wherein the AC/DC ratio signals are transmitted to angle-orientation adjustment controls in a manufacturing process.

28. The process of claim 12 wherein the AC/DC ratio signals are transmitted to angle-orientation adjustment controls in a manufacturing process.

29. The process of claim 5 wherein the AC/DC ratio signals are employed in a data acquisition system capable of producing a display or recording.

30. The process of claim 6 wherein the AC/DC ratio signals are employed in a data acquisition system capable of producing a display or recording.

31. The process of claim 7 wherein the AC/DC ratio signals are employed in a data acquisition system capable of producing a display or recording.

32. The process of claim 8 wherein the AC/DC ratio signals are employed in a data acquisition system capable of producing a display or recording.

33. The process of claim 9 wherein the AC/DC ratio signals are employed in a data acquisition system capable of producing a display or recording.

34. The process of claim 10 wherein the AC/DC ratio signals are employed in a data acquisition system capable of producing a display or recording.

35. The process of claim 11 wherein the AC/DC ratio signals are employed in a data acquisition system capable of producing a display or recording.

36. The process of claim 12 wherein the AC/DC ratio signals are employed in a data acquisition system capable of producing a display or recording.

37. Apparatus for sensing the angular orientation of at least one line or slit element of an article comprising:
1. means for producing two convergent coherent light beams of the same intensity, one of said beams having a different frequency from said other beam, the frequency difference being within the radio frequency range;
2. means for positioning at least the portion of said article bearing said element within the interference fringe zone produced by the convergence of said two beams, said interference fringe zone comprising a laterally moving fringe pattern having a predetermined fringe period, said article being positioned in such manner that it lies in a plane defined by the axis normal to the plane of the convergent beams and the axis normal to the fringe planes, and said element is in a position, relative to said article such that the longitudinal axis of said element is substantially parallel to the fringe plane or can by rotation of said fringe zone and said article relative to each other around the z-axis defined by the converging beam bisector, be brought into fringe-plane parallel position;
3. adjustment means capable of setting said predetermined fringe period at a size substantially wider than said element or the positive difference between the width of the element and a whole integer multiple of the fringe period;

4. means for continuously rotating said fringe zone and/or said article positioned within said fringe zone relative to each other around the z-axis;
5. means for separating radiation scattered by said line element or transmitted by said slit element into AC and DC signal components; and
6. means for continuously determining the AC/DC ratio during rotation.

38. The apparatus of claim 37 wherein the rotating means comprises means for rotating said fringe zone.

39. The apparatus of claim 37 wherein the rotating means comprises means for rotating said article.

40. The apparatus of claim 37 which includes means for transmitting the AC/DC ratio signals to angle-orientation controls in a manufacturing process.

41. The apparatus of claim 38 which includes means for transmitting the AC/DC ratio signals to angle-orientation controls in a manufacturing process.

42. The apparatus of claim 39 which includes means for transmitting the AC/DC ratio signals to angle-orientation controls in a manufacturing process.

43. The apparatus of claim 37 which includes means for transmitting the AC/DC ratio signals to a data acquisition system capable of producing a display or recording.

44. The apparatus of claim 38 which includes means for transmitting the AC/DC ratio signals to a data acquisition system capable of producing a display or recording.

45. The apparatus of claim 39 which includes means for transmitting the AC/DC ratio signals to a data acquisition system capable of producing a display or recording.

46. The process of claim 1 wherein the fringe period is about twice as wide as the positive difference between the width of the element and a whole integer multiple of the fringe period.

47. The process of claim 46 wherein the illuminated length of the element is substantially larger than the fringe period.

48. The process of claim 46 wherein the said at least one element is a plurality of elements.

49. The process of claim 47 wherein the said at least one element is a plurality of elements.

* * * * *